United States Patent
Fukuda

(10) Patent No.: US 6,842,507 B2
(45) Date of Patent: Jan. 11, 2005

(54) SIMPLE STRUCTURED PORTABLE PHONE WITH VIDEO ANSWERPHONE MESSAGE FUNCTION AND PORTABLE PHONE SYSTEM INCLUDING THE SAME

(75) Inventor: Michiko Fukuda, Tokyo (JP)

(73) Assignee: NEC Corporation, Tokyo (JP)

(*) Notice: Subject to any disclaimer, the term of this patent is extended or adjusted under 35 U.S.C. 154(b) by 230 days.

(21) Appl. No.: 10/290,455

(22) Filed: Nov. 8, 2002

(65) Prior Publication Data

US 2003/0123621 A1 Jul. 3, 2003

(30) Foreign Application Priority Data

Nov. 8, 2001 (JP) ........................................ 2001-343069

(51) Int. Cl.[7] .............................................. H04M 1/64
(52) U.S. Cl. ............................... 379/88.13; 348/14.06; 379/88.23
(58) Field of Search ...................... 379/67.1, 76, 88.13, 379/88.17, 88.18, 88.22, 88.23, 88.27, 88.28, 93.25, 90.01, 93.01, 93.14; 348/14.01, 14.06

(56) References Cited

U.S. PATENT DOCUMENTS

| | | | | |
|---|---|---|---|---|
| 5,189,691 A | * | 2/1993 | Dunlap | ......................... 379/70 |
| 5,794,018 A | * | 8/1998 | Vrvilo et al. | ................ 713/400 |
| 5,896,165 A | * | 4/1999 | Rao | ......................... 348/14.06 |
| 6,377,664 B2 | * | 4/2002 | Gerszberg et al. | ....... 379/88.13 |
| 2002/0047892 A1 | * | 4/2002 | Gonsalves, Jr. | .......... 348/14.06 |
| 2002/0085087 A1 | | 7/2002 | Hong | |
| 2003/0041333 A1 | * | 2/2003 | Allen et al. | .................. 725/106 |
| 2003/0123621 A1 | * | 7/2003 | Fukuda | ..................... 379/88.13 |

FOREIGN PATENT DOCUMENTS

| | | |
|---|---|---|
| EP | 0 804 045 A2 | 10/1997 |
| JP | 5137133 A | 6/1993 |
| JP | 7030639 A | 1/1995 |
| JP | 7115633 A | 5/1995 |
| JP | 7-203071 | 8/1995 |
| JP | 2000-13529 | 1/2000 |
| JP | 2000134592 A | 5/2000 |
| JP | 2000-332916 | 11/2000 |
| KR | 2001017435 A | 3/2001 |

* cited by examiner

Primary Examiner—Roland Foster
(74) Attorney, Agent, or Firm—Whitham, Curtis & Christofferson, PC

(57) ABSTRACT

A destination portable phone comprises a multimedia file retention memory 100 for storing and retaining voice data and image data specified as a video answerphone message in a multimedia file format that enables synchronous reproduction of the data, an answerphone mode starting unit for starting the memory to read out the message at the answerphone setting when a call is originated from a transmitting unit of an origination portable phone by opening a voice channel, and a transmitting unit for receiving and transmitting the message by opening the data channel.

12 Claims, 4 Drawing Sheets

FIG. 1 EXISTING ART

FIG. 2 EXISTING ART

SIMPLE STRUCTURED PORTABLE PHONE WITH VIDEO ANSWERPHONE MESSAGE FUNCTION AND PORTABLE PHONE SYSTEM INCLUDING THE SAME

BACKGROUND OF THE INVENTION

The present invention relates to a portable phone with a video answerphone message function, not provided with a picture phone function in the phone body, but with a video answerphone message function, and a portable phone system including the same.

In recent years, along with the popularization of a high-speed data transmission in the radio network field, expectations on the multimedia is gradually increased also in the portable phone field and it is anticipated that more and more multimedia application functions will be mounted on portable phones in future. In this context, there is a tendency of an introduction of a picture phone function enabling real-time exchanges of voice data and image data, for example.

There has been disclosed a technology of improving the answerphone message only in voice used before to a video answerphone message by using the picture phone function in Japanese Unexamined Patent Publication (Kokai) No. 13529 of 2000, titled "Picture Phone Device Having Automatic Answering Function," for example, and further disclosed a terminal visually enabling a mutual confirmation of the other party by answering on an answerphone and recording a message from the other party with voices and images in Japanese Unexamined Patent Publication (Kokai) No 332916 of 2000, titled "Portable Picture Phone Terminal," for example.

In a portable phone system with a video answerphone message function according to an existing art, however, there is a need for giving a picture phone function to both a phone of the origination party and a phone of the answering party in the basic structure. In other words, the phones themselves need to have means for inputting images and voices or means for encoding image data and voice data input thereby and further there is a need for using a communications protocol peculiar to picture phones in line connections. As a result, both phones of the origination party and the answering party are complicated in design, which leads to a large-sized configuration inevitably. Particularly, considering the applicability as a portable phone, it causes a problem that it is hard to realize a configuration that meets the recent requirements of downsized and lightweight phones.

SUMMARY OF THE INVENTION

The present invention has been provided to solve the above problem. It is a technical object of the present invention to provide a simple structured portable phone with a video answerphone message function, which can be downsized and lightweight without a picture phone function in the phone body.

According to one aspect of the present invention, there is provided a portable phone with a video answerphone message function capable of transmitting a video answerphone message. The portable phone comprises a multimedia file retention memory for storing and retaining voice data and image data specified as a video answerphone message in a multimedia file format so that the voice data and the image data can be synchronously reproduced, a receiving unit for receiving a call originated from an origination party, an answerphone mode starting unit for starting the multimedia file retention memory on an answerphone mode to be executed when the receiving unit has a call destination caused by the call originated from the origination party at an answerphone setting and for outputting the corresponding data in the multimedia file from the multimedia file retention memory, and a transmitting unit for transmitting the corresponding data in the multimedia file output from the multimedia file retention memory to the origination party as a video answerphone message by opening a data channel.

According the present invention, there is provided a portable phone system with a video answerphone message function, having the portable phone with the video answerphone message function in the above as a destination portable phone and having an origination portable phone with a transmitting unit for performing a transmission for originating a call to the destination portable phone by opening a voice channel.

According to the present invention, there is further provided the portable phone system with the video answerphone message function, wherein the origination portable phone has a multimedia file analysis unit for receiving the video answerphone message made of the corresponding data in the multimedia file output from the multimedia file retention memory via the data channel and then analyzing the contents of the multimedia file included in the video answerphone message to extract and separate the voice data and the image data.

According to the present invention, there is provided the portable phone system with the video answerphone message function, wherein the system applies a multi-call function in a transmission format enabling a simultaneous operation of originating a call from the origination portable phone to the destination portable phone by opening the voice channel and answering from the destination portable phone to the origination portable phone by opening the data channel.

According to another aspect of the present invention, there is provided a portable phone with a video answerphone message function capable of transmitting a video answerphone message. The portable phone comprises a multimedia file retention memory for storing and retaining voice data and image data specified as a video answerphone message in a multimedia file format so that the voice data and the image data can be synchronously reproduced, a receiving unit for receiving a call originated from an origination party, an answerphone mode starting unit for starting the multimedia file retention memory on an answerphone mode to be executed when the receiving unit has a call destination caused by the call originated from the origination party at an answerphone setting and for outputting the corresponding data in the multimedia file from the multimedia file retention memory, a transmission protocol generation unit for converting the corresponding data in the multimedia file output from the multimedia file retention memory to one in a given transmission protocol, and a transmitting unit for transmitting the corresponding data in the multimedia file output from the multimedia file retention memory and converted to one in the given transmission protocol by the transmission protocol generation unit to the origination party as a video answerphone message by opening a data channel.

According to the present invention, there is provided a portable phone system with a video answerphone message function, having the portable phone with the video answerphone message function in the above as a destination portable phone and having an origination portable phone with a transmitting unit for performing a transmission for originating a call to the destination portable phone by opening a voice channel.

According to the present invention, there is further provided the portable phone system with the video answerphone message function, wherein the origination portable phone has a transmission protocol analysis unit for receiving the video answerphone message made of the corresponding data in the multimedia file converted to one in the given transmission protocol by the transmission protocol generation unit via the data channel and then analyzing the contents of the transmission protocol included in the video answerphone message to extract and separate the voice data and the image data.

According to the present invention, there is still further provided the portable phone system with the video answerphone message function, wherein the system applies a multi-call function in a transmission format enabling a simultaneous operation of originating a call from the origination portable phone to the destination portable phone by opening the voice channel and answering from the destination portable phone to the origination portable phone by opening the data channel.

Other objects, features and advantages of the invention will become apparent upon a reading of the following detailed description.

DESCRIPTION OF THE PREFERRED EMBODIMENTS

First, an existing art will be described to help you understand the present invention with reference to the accompanying drawings.

Hereinafter, the basic operation of a portable phone system with a video answerphone message function as an example of an existing art will be described with reference to a block diagram showing a basic configuration of an answering picture phone 5 in FIG. 1 and a block diagram showing a basic configuration of a calling picture phone 6 in FIG. 2.

Figure 1:
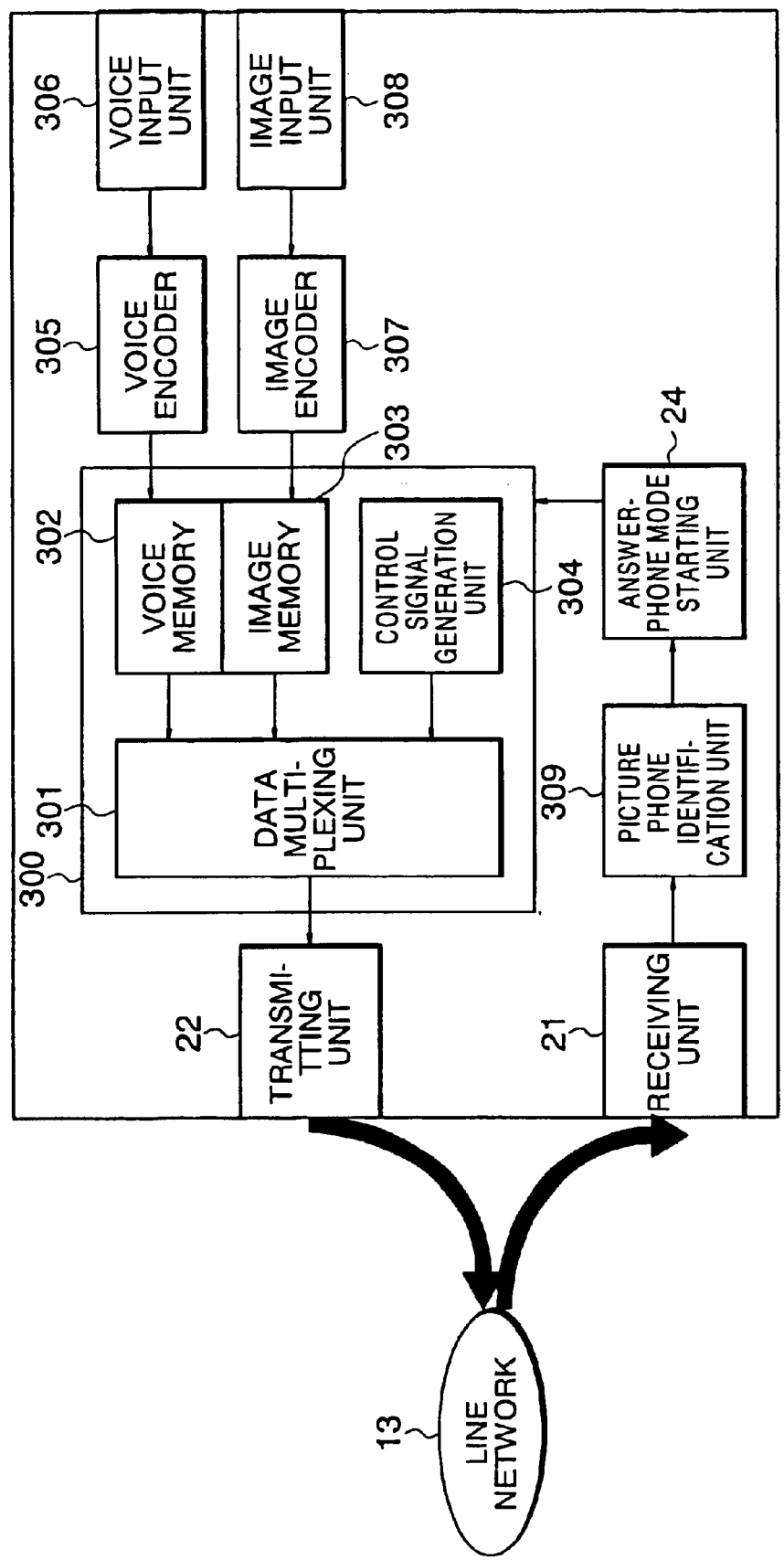
FIG. 1 is a block diagram showing a basic configuration of a picture phone of an answering party applied to a portable phone system with a video answerphone message function as an example of an existing art.

In this phone system, the answering picture phone 5 shown in FIG. 1 has basic picture phone functions including a video answerphone message function. More specifically, when voice data is input to the phone via a voice input unit 306 such as a microphone, a voice encoder 305 compresses the voice data and then the compressed data is stored in a voice memory 302 in an answerphone unit 300, and when image data is input to the phone via an image input unit 308 such as a camera, an image encoder 307 compresses the image data and then the compressed data is stored in an image memory 303 in the answerphone unit 300. A video answerphone message comprises the voice data and the image data.

Figure 2:
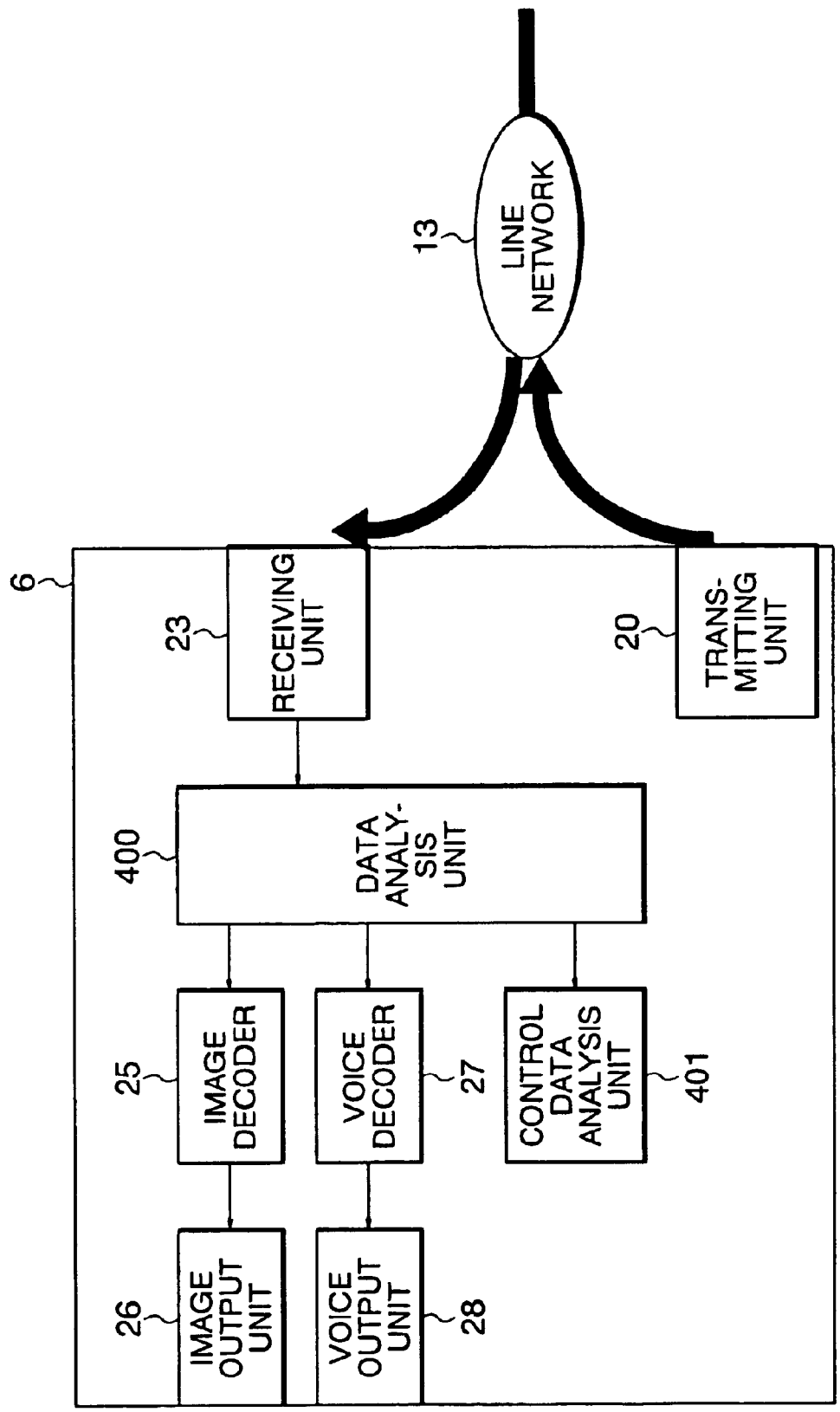
FIG. 2 is a block diagram showing a basic configuration of a picture phone of an origination party to which a video answerphone message is transmitted from the phone of the answering party shown in FIG. 1.

Accordingly, if the answerphone is present when the answering picture phone 5 has a call destination caused by a call originated from the calling picture phone 6 shown in FIG. 2, the answering picture phone 5 automatically transmits a previously generated video answerphone message to the calling picture phone 6 after a lapse of a given period of time.

In the answerphone operation, a picture phone identification unit 309 determines whether the calling picture phone 6 has the picture phone function on the basis of information on the call originated from the calling picture phone 6 received via a line network 13 and a receiving unit 21; if it determines the phone has the picture phone function, an answerphone mode starting unit 24 activates the answerphone unit 300.

The answerphone unit 300 reads out the voice data and the image data stored in the voice memory 302 and the image memory 303 and a data multiplexing unit 301 combines the readout data with control data generated by a control signal generation unit 304 for multiplexing to transmit the combined data to a transmitting unit 22 as a video answerphone message. The transmitting unit 22 transmits the transmitted video answerphone message to the calling picture phone 6 via the line network 13 again. In this connection, the case can be exemplified using the H. 245 protocol regarding standards of the control data and the H. 223 protocol regarding standards of the multiplexed data.

In the calling picture phone 6, after the receiving unit 23 receives the video answerphone message from the answering picture phone 5, the message is delivered to a data decomposition unit 400 and the data decomposition unit 400 separates the video answerphone message made of the multiplexed data into the image data, the voice data, and the control data by extraction, and the individual data extracted and separated are input to an image decoder 25, a voice decoder 27, and a control data analyzing unit 401, respectively, in order. The image decoder 25 decodes the image data and then transmits it to an image output unit 26 such as an LCD, the image output unit 26 displays the decoded image data, the voice decoder 27 decodes the voice data and then transmits it to a voice output unit 28 such as a loud speaker, and the voice output unit 28 vocalizes the decoded voice data.

Including the example described hereinabove, a portable phone with a video answerphone message function and a portable phone system including the same according to the existing art have the problem described in the background in this specification.

The preferred embodiments of the present invention will now be described in detail hereinafter with reference to the accompanying drawings.

In the portable phone with a video answerphone message function according to the present invention, in order to endow the portable phone with the video answerphone message function instead of a picture phone function by improving a destination portable phone that receives a normal phone call, voice data and image data used as a video answerphone message are acquired by downloading via a network or through a memory detachable from the phone body in a general-purpose multimedia file format easy to appropriate, which enables the voice data and the image data to be reproduced synchronously and then they are stored and retained in a multimedia file retention memory.

Therefore, it is unnecessary to connect a line using a protocol exclusively for picture phones from an origination portable phone like a conventional one, which results in realizing a simple structure of the entire system in addition to downsizing the entire portable phone system with the video answerphone message function and reducing individual phones in size and weight (particularly remarkable in the destination portable phone).

[First Embodiment]

Figure 3:
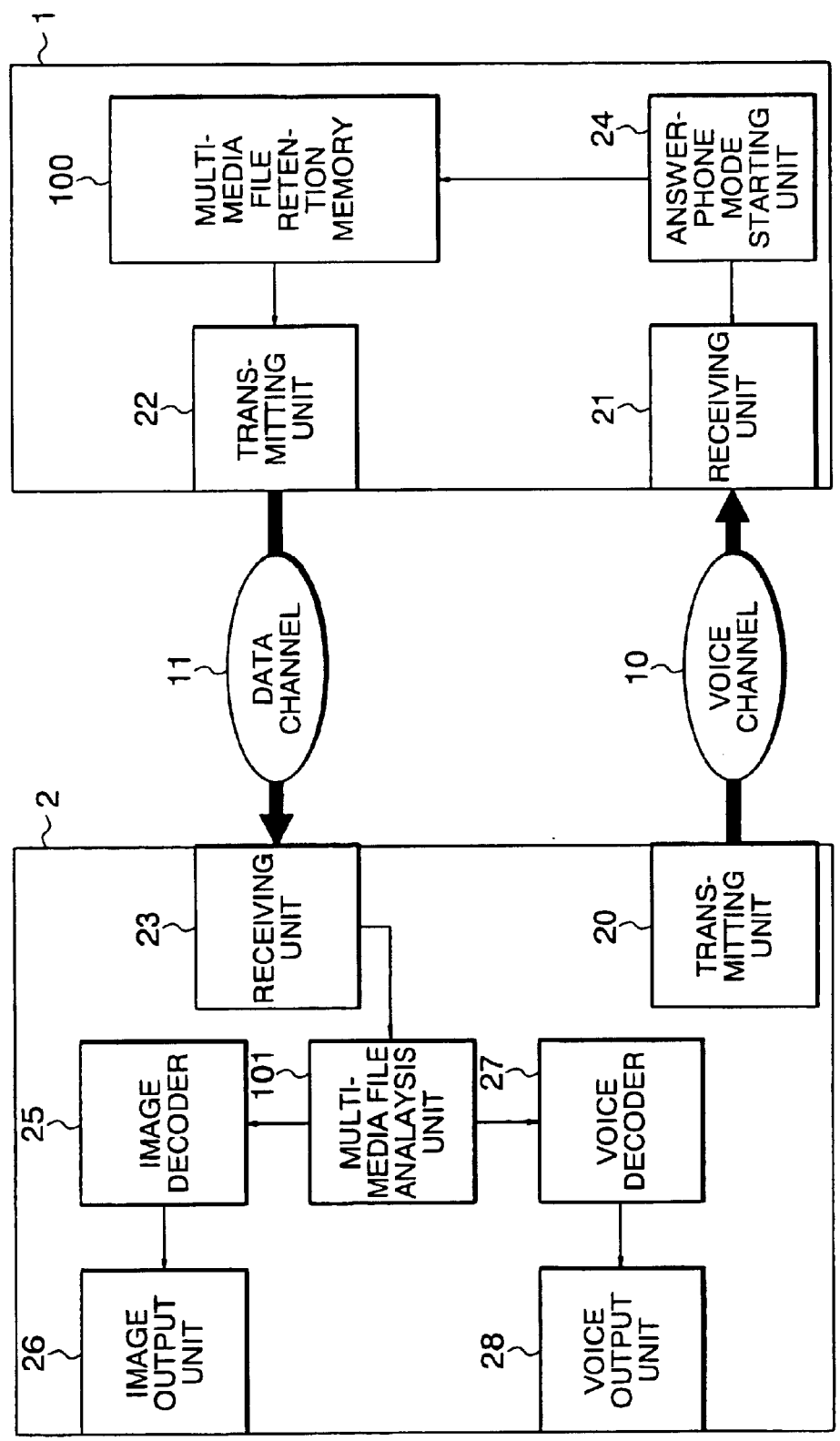
FIG. 3 is a block diagram showing a basic configuration of a portable phone system with a video answerphone message function according to a first embodiment of the present invention.

Referring to FIG. 3, a portable phone system with a video answerphone message function according to a first embodiment of the present invention includes a destination portable phone 1 provided with a video answerphone message function instead of a picture phone function and an origination portable phone 2 to which a video answerphone message is transmitted from the destination portable phone 1.

The portable phone system is capable of originating a call from the origination portable phone 2 to the destination portable phone 1 by opening voice channel 10 and making an answer from the destination portable phone 1 to the origination portable phone 2 by opening a data channel 11 at a time using a multi-call function.

The destination portable phone 1 comprises a multimedia file retention memory 100 for storing and retaining voice data and image data specified as a video answerphone message in the multimedia file format so that the voice data and the image data can be synchronously reproduced, a receiving unit 21 for receiving calls from the origination party (the origination portable phone 2), an answerphone mode starting unit 24 for starting the multimedia file retention memory 100 on an answerphone mode to output the corresponding data in the multimedia file at the answerphone setting when the receiving unit 21 has a call destination caused by a call originated from the origination party, and a transmitting unit 22 for transmitting an answer, namely, the corresponding data in the multimedia file output from the multimedia file retention memory 100 as a video answerphone message to the origination party by opening the data channel 11.

In other words, comparing the destination portable phone 1 described here with the answering picture phone 5 of the existing art shown in FIG. 1, they have the same components regarding the transmitting unit 22 and the receiving unit 21 as communication function units, while the destination portable phone 1 differs from the picture phone in other components so as to be provided with a video answerphone message function instead of the picture phone function.

Furthermore, the data in the multimedia file stored and retained in the multimedia file retention memory is assumed to be available by downloading via a network not shown here.

Other configurations, however, are possible; for example, a configuration in which the data is available from a memory card, which is detachable from the phone body and which stores and retains data previously generated in an external device, or a configuration in which the data is generated by generation means of the destination portable phone 1 provided therewith. It should be noted that, however, the phone provided with the generation means is preferably configured with keeping the advantages of the cellular type, that is, downsized and lightweight features.

Where else, the multimedia file format is preferably a format including information that enables synchronous reproduction of image data and voice data and a format in which the voice data is interleaved with the image data in time series so that the voice data and the image data can be synchronously reproduced without reading the file to the end. For example, there is a case of an application of an MP4 file format defined by ISO/IEC 14496-1. In this connection, the application of the format including information that enables synchronous reproduction of image data and voice data is a known technology. Related technologies are disclosed in a multimedia communication device in Japanese Unexamined Patent Publication (Kokai) No. 7-203072 or in Japanese Unexamined Patent Publication (Kokai) No. 7-203072.

On the other hand, the origination portable phone 2 comprises a transmitting unit 20 for performing a transmission to originate a call to the destination portable phone by opening the voice channel 10, a receiving unit 23 for receiving a video answerphone message (the corresponding data in the multimedia file) output from the multimedia file retention memory 100 in the destination portable phone 1 via the data channel 11, a multimedia file analysis unit 101 for extracting and separating the voice data and image data by analyzing the corresponding data in the multimedia file received by the receiving unit 23, an image decoder 25 for decoding the image data that is one of the data extracted and separated by the multimedia file analysis unit 101, an image output unit 26 for displaying the image data decoded by the image decoder 25, a voice decoder 27 for decoding the other of the data extracted and separated by the multimedia file analysis unit 101, and a voice output unit 28 for vocalizing the voice data decoded by the voice decoder 27.

In other words, comparing the origination portable phone 2 described here with the calling picture phone 6 of the existing art shown in FIG. 2, they differ from each other in that the calling picture phone 6 has the data decomposition unit 400 for decomposing multiplexed data while the origination portable phone 2 has the multimedia file analysis unit 101 for analyzing data in the multimedia file instead, but they have the same configuration in other components, the transmitting unit 20 and the receiving unit 23 as communication function units, the image decoder 25 and the image output unit 26, and the voice decoder 27 and the voice output unit 28.

Hereinafter, an operation of the portable phone system at the answerphone setting will be described in order. It should be noted that, however, a video answerphone message is assumed to be stored and retained previously in the multimedia file format in the multimedia file retention memory 100 of the destination portable phone 1 at the start of the application.

In this portable phone system, normally in the operation procedure, the origination portable phone 2 originates a call to the destination portable phone 1 in a voice telephone (call) procedure by opening the voice channel 10, first. This causes the destination portable phone 1 to have a call destination. Unless a user answers the call destination in a given period of time after he/she has the call destination, the answerphone mode starting unit 24 operates and enters the answerphone mode to start the multimedia file retention memory 100 after a lapse of a given period of time, by which the corresponding data in the multimedia file specified as a video answerphone message intended for the origination portable phone 2 is read and output from the multimedia file retention memory 100. Therefore, the transmitting unit 22 having received the corresponding data in the multimedia file transmits the data as a video answerphone message to the origination portable phone 2 by opening the data channel 11.

The origination portable phone 2 receives the video answerphone message (the corresponding data in the multimedia file) at the receiving unit 23 and delivers it to the multimedia file analysis unit 101. The multimedia file analysis unit 101 analyzes the contents of the video answerphone message (the corresponding data in the multimedia file) and extracts and separates voice data and image data in a compression data format. The image data, which is one of the separated data, is decoded by the image decoder 25 and then transmitted to the image output unit 26 and the image output unit 26 displays the image data. The voice data, which is the other of the separated data, is decoded by the voice decoder 27 and then transmitted to the voice output unit 28, and the voice output unit 28 vocalizes the voice data. The display output of the image data is synchronized with the vocalization output of the voice data for reproduction. Therefore, a user of the origination portable phone 2 checks the contents of the video answerphone message with referring to the synchronously reproduced display output and vocalization output and then transmits a message to the destination portable phone 1 using the voice channel 10 again from the transmitting unit 20, if necessary, according to the contents.

In the portable phone system with a video answerphone message function having the above configuration, the destination portable phone 1 acquires information that enables synchronous reproduction of voice data and image data used as a video answerphone message with other related information appended in the general-purpose multimedia file format easy to appropriate via a network or a memory and than previously stores and retains the information in the multimedia file retention memory 100 for preparation. Therefore, the phone itself need not have means for inputting images and voices and means for encoding image data and voice data input thereby like a conventional one.

Furthermore, using a multi-call function that enables the voice channel and the data channel to be opened simultaneously, the answerphone mode starting unit 24 activates the multimedia file retention memory 100 on the answerphone mode to output the corresponding data in the multimedia file at the answerphone setting when the destination portable phone 1 has a call destination originated from the origination portable phone 2. In response to this, the transmitting section 22 transmits the corresponding data in the multimedia file output from the multimedia file retention memory 100 as a video answerphone message by opening the data channel 11 in this configuration. In other words, the following function is realized; automatically transmitting an answer, that is, a video answerphone message to the origination portable phone 2 in response to the origination call from the origination portable phone 2 at the answerphone setting on the destination portable phone 1. Therefore, the origination portable phone 2 need not connect a line using a protocol dedicated to picture phones like the conventional one, which results in a simple structure of the entire system with the destination portable phone 1 having a video answerphone message function instead of a picture phone function, in addition to realizing the downsized portable phone system including the origination portable phone 2 and reducing individual phones in size and weight (particularly remarkable in the destination portable phone 1).

[Second Embodiment]

Figure 4:
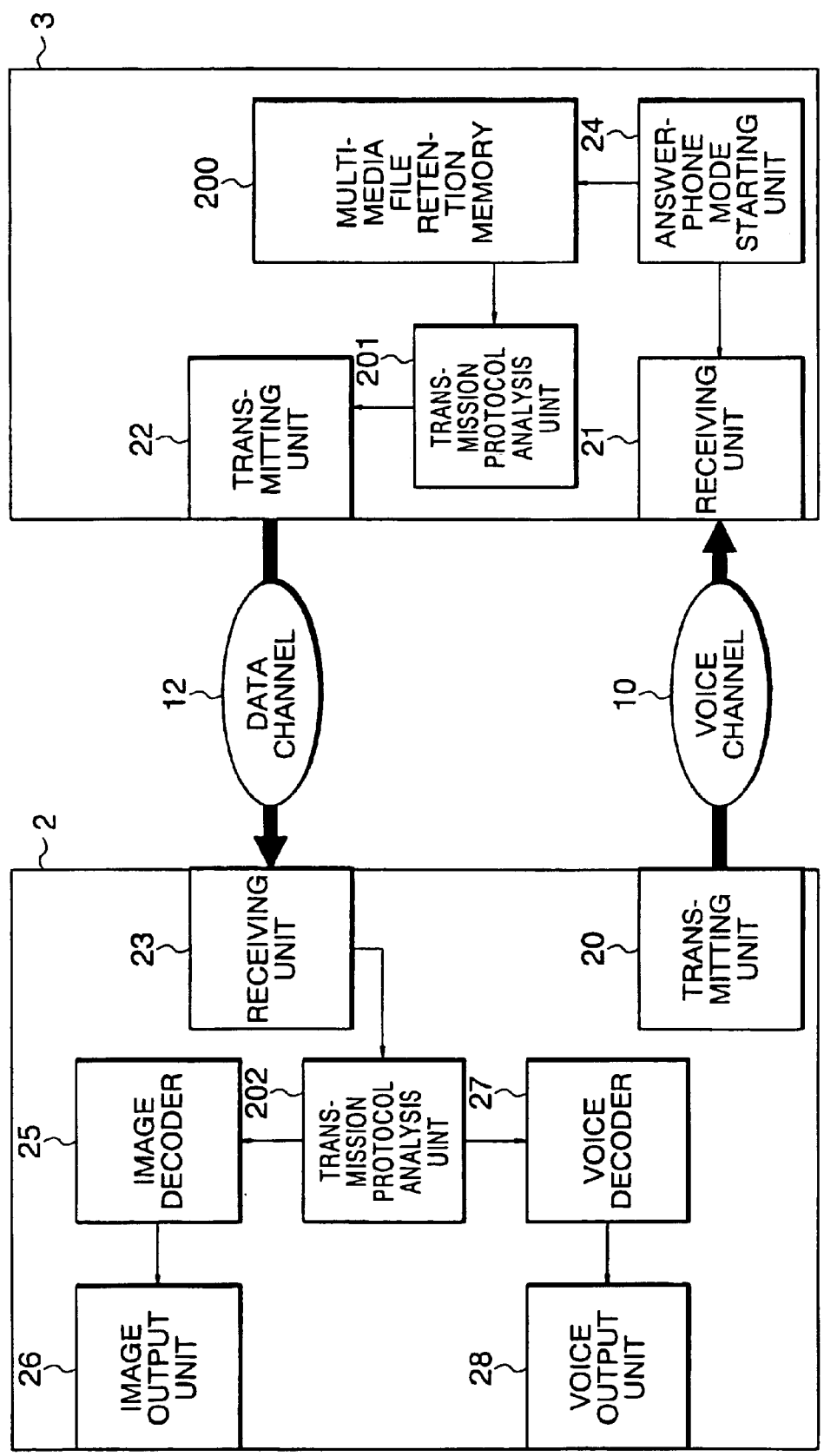
FIG. 4 is a block diagram showing a basic configuration of a portable phone system with a video answerphone message function according to a second embodiment of the present invention.

Referring to FIG. 4, the portable phone system with a video answerphone message function according to a second embodiment of the present invention comprises a destination portable phone 3 having a video answerphone message function without a picture phone function and an origination portable phone 4 to which a video an answerphone message is transmitted from the destination portable phone 3, in the same manner as in the first embodiment.

The portable phone system is also capable of originating a call from the origination portable phone 4 to the destination portable phone 3 by opening a voice channel 10 and making an answer from the destination portable phone 3 to the origination portable phone 4 by opening a data channel 12 at a time using a multi-call function.

It should be noted that, however, in comparison with the above destination portable phone 1, the destination portable phone 3 differs from the destination portable phone 1 in that the multimedia file retention memory 200 is activated by the answerphone mode starting unit 24 to output the corresponding data in the multimedia file to a transmission protocol generation unit 201 arranged anew instead of outputting the data directly to the transmitting unit 22, the transmission protocol generation unit 201 converts the corresponding data in the multimedia file output from the multimedia file retention memory 200 to one in a given transmission protocol, and the transmitting unit 22 transmits the corresponding data in the multimedia file converted into one in the given transmission protocol by the transmission protocol generation unit 201 as a video answerphone message by opening the data channel 12 such as a packet network. The multimedia file format in the multimedia file retention memory 200 is preferably a non-interleave format for voice data and image data so as to be independent of a specific transmission protocol.

On the other hand, in comparison with the origination portable phone 2 in the first embodiment, the origination portable phone 4 differs from the origination portable phone 2 in that it has a transmission protocol analysis unit 202 for receiving the video answerphone message made of the corresponding data in the multimedia file converted into the given transmission protocol by the transmission protocol generation unit 201 via the data channel 12 and analyzing the contents of the transmission protocol included in the video answerphone message to extract and separate voice data and image data, instead of the multimedia file analysis unit 101.

Hereinafter, an operation in the portable phone system at the answerphone setting will be described in order. Note that, however, the procedure in which the corresponding data in the multimedia file specified as the answerphone message is read and output from the multimedia file retention memory 200 is the same as for the above embodiment in the destination portable phone 3 and therefore its description is omitted here.

Next, in the destination portable phone 3, the corresponding data in the multimedia file having been read out is converted into, for example, the RTP/UDP/IP format in the transmission protocol generation unit 201 and then delivered to the transmitting unit 22 and the transmitting unit 22 transmits the corresponding data in the multimedia file converted into the transmission protocol as a video answerphone message by opening the data channel 12.

In the origination portable phone 4, the receiving unit 23 receives the video answerphone message (the corresponding data in the multimedia file converted into the transmission protocol) and delivers it to the transmission protocol analysis unit 202 and the transmission protocol analysis unit 202 analyzes the contents of the multimedia file included in the video answerphone message and then extracts and separates voice data and image data in the compression data format. The subsequent operations are the same as those described in the origination portable phone 2; the display output of the image data is synchronized with the vocalization output of the voice data for reproduction, by which a user of the origination portable phone 4 checks the contents of the video answerphone message and then transmits a message from the transmitting unit 20 to the destination portable phone 3 by using the voice channel 10 again, if necessary, according to the contents.

In comparison with the above embodiment, the portable phone system with the video answerphone message function having the above configuration has almost the same arrangement except that the destination portable phone 3 has a transmission protocol generation unit 201 additionally and that the origination portable phone 4 has the transmission protocol analysis unit 202 instead and has almost equivalent functions, thereby achieving the same advantages, that is, the entire system having a simple structure while realizing the downsized portable phone system as a whole and downsized and lightweight phones.

While the present invention has been described in connection with certain preferred embodiments hereinabove, it is to be understood that the subject matter encompassed by the present invention is not limited to those specific embodiments. On the contrary, it is naturally intended to include all alternatives, modifications, and equivalents as can be included appropriately within the scope of the technical idea of the present invention.

What is claimed is:

1. A portable phone with a video answerphone message function capable of transmitting a video answerphone message, said portable phone comprising:

a multimedia file retention memory for storing and retaining voice data and image data specified as a video answerphone message in a multimedia file format so that the voice data and the image data can be synchronously reproduced;

a receiving unit for receiving a call originated from an origination party;

an answerphone mode starting unit for starting said multimedia file retention memory on an answerphone mode to be executed when said receiving unit has a call destination caused by the call originated from the origination party at an answerphone setting and for outputting the corresponding data in the multimedia file from said multimedia file retention memory; and a transmitting unit for transmitting the corresponding data in the multimedia file output from said multimedia file retention memory to the origination party as a video answerphone message by opening a data channel.

2. The phone according to claim 1, wherein the data in the multimedia file is acquired by downloading via a network.

3. The phone according to claim 1, wherein the data in the multimedia file is acquired using a memory card detachable from the phone body.

4. A portable phone system with a video answerphone message function, having the portable phone with the video answerphone message function according to claim 1 as a destination portable phone and having an origination portable phone with a transmitting unit for performing a transmission for originating a call to said destination portable phone by opening a voice channel.

5. The system according to claim 4, wherein said origination portable phone has a multimedia file analysis unit for receiving the video answerphone message made of the corresponding data in the multimedia file output from said multimedia file retention memory via said data channel and then analyzing the contents of the multimedia file included in the video answerphone message to extract and separate the voice data and the image data.

6. The system according to claim 5, wherein it applies a multi-call function in a transmission format enabling a simultaneous operation of originating a call from said origination portable phone to said destination portable phone by opening said voice channel and answering from said destination portable phone to said origination portable phone by opening said data channel.

7. A portable phone with a video answerphone message function capable of transmitting a video answerphone message, said portable phone comprising:

a multimedia file retention memory for storing and retaining voice data and image data specified as a video answerphone message in a multimedia file format so that the voice data and the image data can be synchronously reproduced;

a receiving unit for receiving a call originated from an origination party;

an answerphone mode starting unit for starting said multimedia file retention memory on an answerphone mode to be executed when said receiving unit has a call destination caused by the call originated from the origination party at an answerphone setting and for outputting the corresponding data in the multimedia file from said multimedia file retention memory;

a transmission protocol generation unit for converting the corresponding data in the multimedia file output from said multimedia file retention memory to one in a given transmission protocol; and a transmitting unit for transmitting the corresponding data in the multimedia file output from said multimedia file retention memory and converted to one in the given transmission protocol by said transmission protocol generation unit to the origination party as a video answerphone message by opening a data channel.

8. The phone according to claim 7, wherein the data in the multimedia file is acquired by downloading via a network.

9. The phone according to claim 7, wherein the data in the multimedia file is acquired using a memory card detachable from the phone body.

10. A portable phone system with a video answerphone message function, having the portable phone with the video answerphone message function according to claim 7 as a destination portable phone and having an origination portable phone with a transmitting unit for performing a transmission for originating a call to said destination portable phone by opening a voice channel.

11. The system according to claim 10, wherein said origination portable phone has a transmission protocol analysis unit for receiving the video answerphone message made of the corresponding data in the multimedia file converted to one in the given transmission protocol by said transmission protocol generation unit via said data channel and then analyzing the contents of the transmission protocol included in the video answerphone message to extract and separate the voice data and the image data.

12. The system according to claim 11, wherein it applies a multi-call function in a transmission format enabling a simultaneous operation of originating a call from said origination portable phone to said destination portable phone by opening said voice channel and answering from said destination portable phone to said origination portable phone by opening said data channel.

* * * * *